(12) United States Patent
Hendren et al.

(10) Patent No.: US 7,815,993 B2
(45) Date of Patent: Oct. 19, 2010

(54) HONEYCOMB FROM PAPER HAVING FLAME RETARDANT THERMOPLASTIC BINDER

(75) Inventors: Gary Lee Hendren, Richmond, VA (US); Subhotosh Khan, Midlothian, VA (US); Mikhail R. Levit, Glen Allen, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 37 days.

(21) Appl. No.: 11/640,011

(22) Filed: Dec. 15, 2006

(65) Prior Publication Data

US 2008/0145600 A1    Jun. 19, 2008

(51) Int. Cl.
*B32B 3/12* (2006.01)
*B29C 73/06* (2006.01)

(52) U.S. Cl. .................... 428/116; 156/197; 493/966
(58) Field of Classification Search ................ 428/116, 428/473.5; 52/793.1; 156/292; 493/966
See application file for complete search history.

(56) References Cited

U.S. PATENT DOCUMENTS

| | | |
|---|---|---|
| 3,519,510 A | 7/1970 | Ardolino et al. |
| 3,756,908 A | 9/1973 | Gross |
| 3,767,756 A | 10/1973 | Blades |
| 3,869,429 A | 3/1975 | Blades |
| 3,869,430 A | 3/1975 | Blades |
| 4,118,372 A | 10/1978 | Schaefgen |
| 4,374,978 A | 2/1983 | Fujiwara |
| 4,557,961 A | 12/1985 | Gorges |
| 4,698,267 A | 10/1987 | Tokarsky |
| 4,710,432 A * | 12/1987 | Nishimura et al. ....... 428/542.8 |
| 4,729,921 A | 3/1988 | Tokarsky |
| 5,021,283 A * | 6/1991 | Takenaka et al. ............ 428/116 |
| 5,026,456 A * | 6/1991 | Hesler et al. ................ 162/146 |
| 5,137,768 A * | 8/1992 | Lin ............................ 428/116 |
| 5,217,556 A * | 6/1993 | Fell ............................ 156/205 |
| 5,223,094 A | 6/1993 | Kirayoglu et al. |
| 5,314,742 A | 5/1994 | Kirayoglu et al. |
| 5,514,444 A | 5/1996 | Buyny et al. |
| 5,789,059 A | 8/1998 | Nomoto |
| 5,833,807 A | 11/1998 | Ramachandran et al. |
| 5,955,196 A | 9/1999 | Sakellerides |
| 6,117,518 A * | 9/2000 | Cawse et al. ................ 428/116 |

(Continued)

FOREIGN PATENT DOCUMENTS

EP    1 048 446 A2    11/2000

(Continued)

OTHER PUBLICATIONS

A. Kelly, F. E. Buresch, R. H. Biddulph, Philosophical Transactions of the Royal Society of London. Series A, Mathematical and Physical Sciences, vol. 322. No. 1567, Technology in the 1990s: The Promise of Advanced Material, (Jul. 27, 1987), pp. 409-423.

(Continued)

*Primary Examiner*—Gordon R Baldwin

(57) ABSTRACT

This invention relates to an improved flame retardant honeycomb comprising high modulus fiber and a flame retardant thermoplastic binder having a melt point of from 120° C. to 350° C. and a limiting oxygen index of 26 or greater, methods for making the honeycomb, and articles comprising the honeycomb. In a preferred embodiment the paper in the honeycomb has a flame classification of UL-94 V-0.

15 Claims, 2 Drawing Sheets

U.S. PATENT DOCUMENTS

| | | | |
|---|---|---|---|
| 6,458,244 | B1 | 10/2002 | Wang et al. |
| 6,544,622 | B1 | 4/2003 | Nomoto |
| 6,551,456 | B2 | 4/2003 | Wang et al. |
| 6,929,848 | B2 | 8/2005 | Samuels et al. |
| 2002/0197466 | A1 | 12/2002 | Ueno et al. |
| 2003/0082974 | A1 | 5/2003 | Samuels et al. |
| 2005/0085146 | A1 | 4/2005 | Farkas et al. |

FOREIGN PATENT DOCUMENTS

| | | |
|---|---|---|
| WO | WO 2005/068288 | 7/2005 |

OTHER PUBLICATIONS

Gould Paper Testing (http://www.gouldpaper.com/GOULDWEB/TESTING.html).

Handbook of Fiber Chemistry, $3^{rd}$ Edition. (pp. 94 95).

* cited by examiner

HONEYCOMB FROM PAPER HAVING FLAME RETARDANT THERMOPLASTIC BINDER

BACKGROUND OF THE INVENTION

1. Field of the Invention

This invention relates to an improved flame retardant honeycomb comprising a flame retardant thermoplastic binder having a melt point of from 120° C. to 350° C. and a limiting oxygen index of 26 or greater, methods for making the honeycomb, and articles comprising the honeycomb. In a preferred embodiment the paper in the honeycomb has a flame classification of UL-94 V-0.

2. Description of Related Art

Paper-based honeycomb is typically formed by (1) applying adhesive resin to sheets of paper along predetermined lines, called node lines, (2) adhering several sheets of paper along these node lines to form a stack, with the node lines of each sheet offset to the adjacent sheets, (3) expanding the stack to form a honeycomb having defined cell walls, (4) impregnating the cell walls of the honeycomb with structural resin by submerging the honeycomb in a liquid resin, and (5) curing the resin with heat. U.S. Pat. No. 5,137,768 to Lin; U.S. Pat. No. 5,789,059 to Nomoto; and U.S. Pat. No. 6,544,622 to Nomoto; disclose honeycombs made from sheets made from high modulus para-aramid materials. These honeycombs are highly prized for structural applications due to their high stiffness and high strength to weight ratio. Generally these honeycombs are made from papers comprising para-aramid fibers, pulp, and/or other fibrous materials plus a binder.

The tendency of a paper to extinguish or spread a flame once ignited can be quantified using Underwriters Laboratories, Inc. test method UL 94, "Standard for Flammability of Plastic Materials for Parts in Devices and Appliances". This testing protocol is used to distinguish a paper's burning characteristics under controlled laboratory conditions. Six of the classifications resulting from this testing relate to materials commonly used in manufacturing enclosures, structural parts, and insulators found in consumer electronic products (5VA, 5 VB, V-0, V-1, V-2, HB). For the purposes of paper used in structural honeycomb, the highest performance, and a desirable objective for flame retardant paper is to pass the V-0 flammability rating.

U.S. Pat. No. 4,557,961 discloses a light-weight, fire-retardant structural panel comprising a honeycomb core formed of aluminum, paper treated to improve its fire resistance characteristics, or the like. This treatment is accomplished by preferably dipping the combustible core material in a liquid bath of phenolic resin and/or a copolymer of vinylidene fluoride and hexafluoropropene so as to render the otherwise combustible paper fire retardant.

In some enduses, honeycomb made from papers containing high modulus fibers and a thermoplastic binder are desired, however, many thermoplastics are very flammable. It is also very costly to post-treat a honeycomb after it has been manufactured. Therefore what is needed is a method to make a flame retardant honeycomb by using a paper containing a flame retardant thermoplastic binder.

BRIEF SUMMARY OF THE INVENTION

This invention relates to a flame resistant honeycomb having cells comprising a paper, the paper comprising 5 to 50 parts by weight thermoplastic material having a melting point of from 120° C. to 350° C., and 50 to 95 parts by weight of a high modulus fiber having a modulus of 600 grams per denier (550 grams per dtex) or greater, based on the total amount of thermoplastic material and high modulus fiber in the paper, wherein the thermoplastic has a limiting oxygen index of at least 26.

DETAILED DESCRIPTION OF THE INVENTION

Figure 1A:
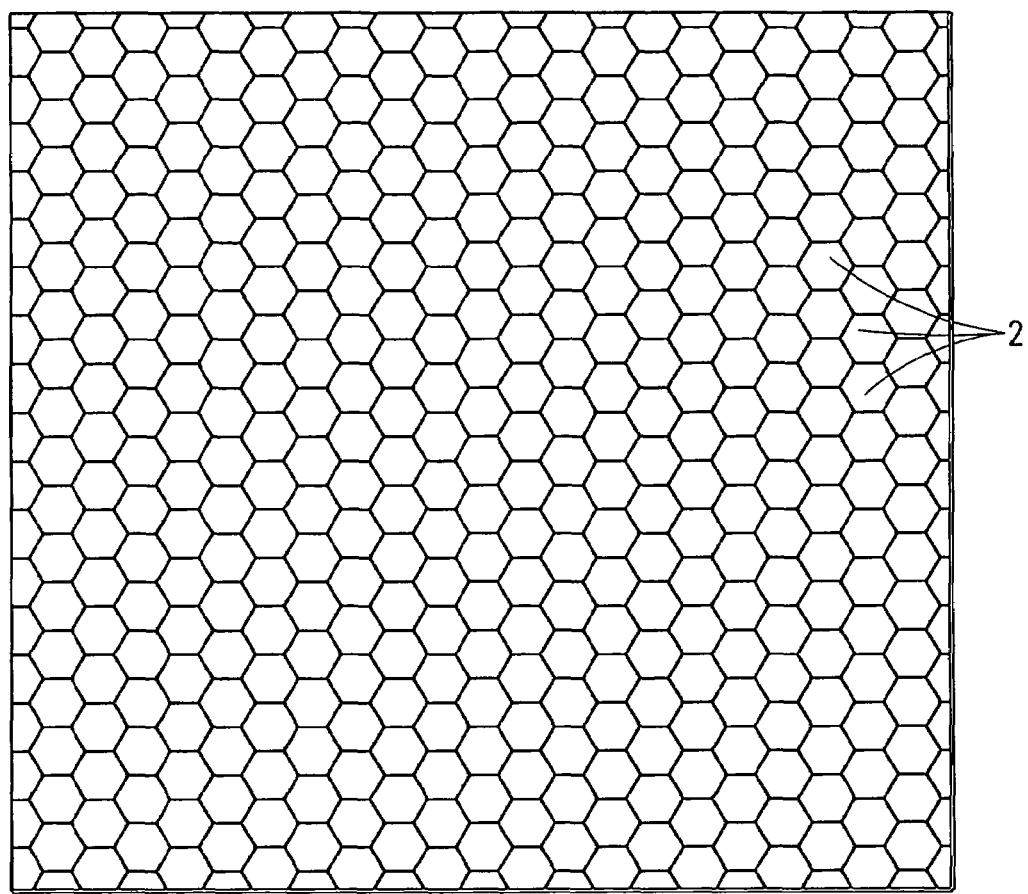
FIGS. 1a and 1b are representations of views of a hexagonal shaped honeycomb.
Figure 1B:
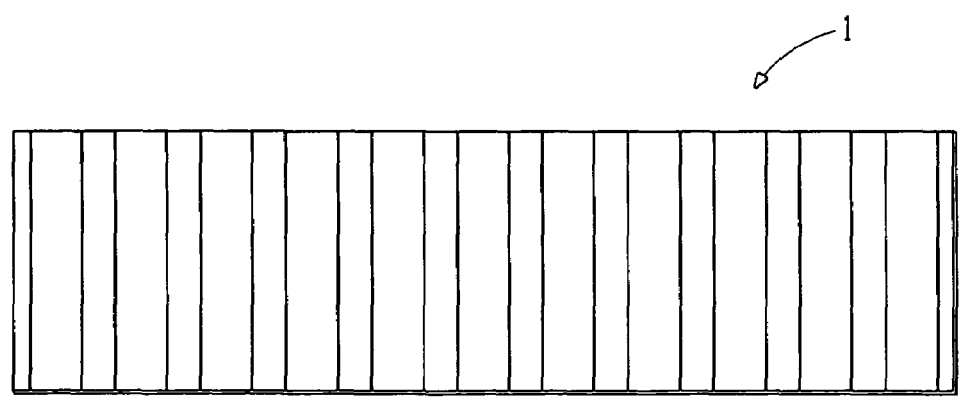
Figure 2:
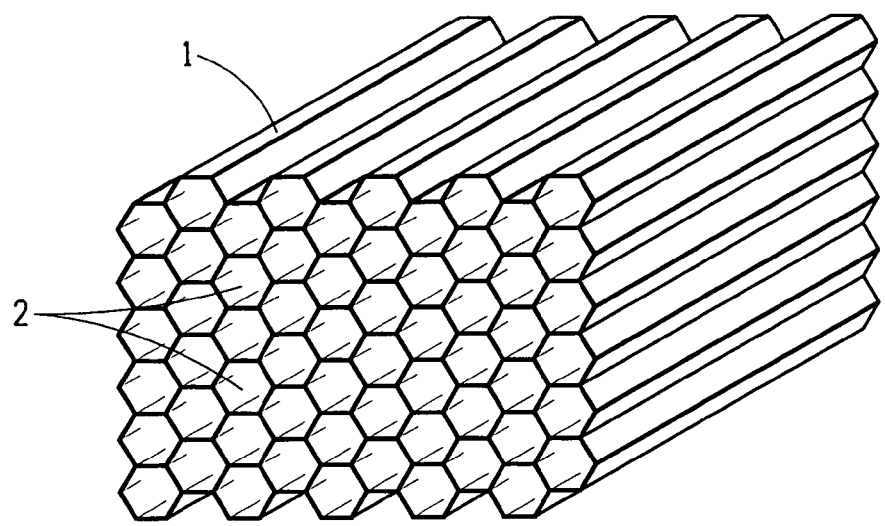
FIG. 2 is a representation of another view of a hexagonal cell shaped honeycomb.

This invention relates to a flame retardant honeycomb made from paper that contains high modulus fiber and a flame retardant thermoplastic binder. Such papers have a UL-94 flammability rating of V-0 or better. FIG. 1a is one illustration of a honeycomb. FIG. 1b is an orthogonal view of the honeycomb shown in FIG. 1a and FIG. 2 is a three-dimensional view of the honeycomb. Shown is honeycomb 1 having hexagonal cells 2. Hexagonal cells are shown; however, other geometric arrangements are possible with square and flexcore cells being the other most common possible arrangements. Such cell types are well known in the art and reference can be made to Honeycomb Technology by T. Bitzer (Chapman & Hall, publishers, 1997) for additional information on possible geometric cell types.

In many embodiments, the honeycomb is provided with a structural or matrix resin, typically a thermoset resin that fully impregnates, saturates, or coats the cell walls of the honeycomb. The resin is then further crosslinked or cured to realize of the final properties (stiffness and strength) to the honeycomb. In some embodiments these structural resins include epoxy resins, phenolic resins, acrylic resins, polyimide resins, and mixtures thereof.

The cell walls of the honeycomb are preferably formed from a paper comprising a high modulus fiber and a flame retardant thermoplastic material. In some embodiments the term paper is employed in its normal meaning and refers to a nonwoven sheet prepared using conventional wet-lay papermaking processes and equipment. However, the definition of paper in some embodiments includes, in general, any nonwoven sheet that requires a binder material and has properties sufficient to provide an adequate honeycomb structure.

The thickness of the paper used in this invention is dependent upon the end use or desired properties of the honeycomb and in some embodiments is typically from 1 to 5 mils (25 to 130 micrometers) thick. In some embodiments, the basis weight of the paper is from 0.5 to 6 ounces per square yard (15 to 200 grams per square meter).

The paper used in the honeycomb comprises 5 to 50 parts by weight flame retardant thermoplastic material having a melting point of from 120° C. to 350° C., and 50 to 95 parts by weight of a high modulus fiber having a modulus of 600 grams per denier (550 grams per dtex) or greater, based on the total amount of thermoplastic material and high modulus fiber in the paper. The thermoplastic is flame retardant because it has a limiting oxygen index (LOI) of at least 26. In some embodiments the high modulus fiber is present in the paper in an amount of from about 60 to 80 parts by weight, and in some embodiments the thermoplastic material is present in the paper in an amount of from 20 to 40 parts by weight.

The paper can also include inorganic particles and representative particles include mica, vermiculite, and the like; the addition of these particles can impart properties such as improved fire resistance, thermal conductivity, dimensional stability, and the like to the paper and the final honeycomb.

The paper used in this invention can be formed on equipment of any scale, from laboratory screens to commercial-sized papermaking machinery, including such commonly used machines as Fourdrinier or inclined wire paper machines. A typical process involves making a dispersion of high modulus fibrous material such as floc and/or pulp and a binder material in an aqueous liquid, draining the liquid from the dispersion to yield a wet composition and drying the wet paper composition. The dispersion can be made either by dispersing the fibers and then adding the binder material or by dispersing the binder material and then adding the fibers. The final dispersion can also be made by combining a dispersion of fibers with a dispersion of the binder material; the dispersion can optionally include other additives such as inorganic materials. If the binder material is a fiber, the fiber can be added to the dispersion by first making a mixture with high modulus fibers, or the fiber can be added separately to the dispersion. The concentration of fibers in the dispersion can range from 0.01 to 1.0 weight percent based on the total weight of the dispersion. The concentration of a binder material in the dispersion can be up to 50 weight percent based on the total weight of solids. In a typical process, the aqueous liquid of the dispersion is generally water, but may include various other materials such as pH-adjusting materials, forming aids, surfactants, defoamers and the like. The aqueous liquid is usually drained from the dispersion by conducting the dispersion onto a screen or other perforated support, retaining the dispersed solids and then passing the liquid to yield a wet paper composition. The wet composition, once formed on the support, is usually further dewatered by vacuum or other pressure forces and further dried by evaporating the remaining liquid.

In one preferred embodiment high modulus fibrous material and a thermoplastic binder, such as a mixture of short fibers or short fibers and binder particles, can be slurried together to form a mix that is converted to paper on a wire screen or belt. Reference is made to U.S. patent and patent application Ser. Nos. 3,756,908 to Gross; U.S. Pat. Nos. 4,698,267 and 4,729,921 to Tokarsky; U.S. Pat. No. 5,026,456 to Hesler et al.; U.S. Pat. No. 5,223,094 to Kirayoglu et al.; U.S. Pat. No. 5,314,742 to Kirayoglu et al.; U.S. Pat. Nos. 6,458,244 and 6,551,456 to Wang et al.; and U.S. Pat. No. 6,929,848 and 2003-0082974 to Samuels et al. for illustrative processes for forming papers from various types of fibrous material and binders.

Once the paper is formed, it is preferably hot calendered. This can increase the density and strength of the paper. Generally one or more layers of the paper are calendered in the nip between metal-metal, metal-composite, or composite-composite rolls. Alternatively, one or more layers of the paper can be compressed in a platen press at a pressure, temperature, and time that are optimal for a particular composition and final application. Calendering paper in this manner also decreases the porosity of the formed paper, and in some preferred embodiments the paper used in the honeycomb is calendered paper. Heat-treatment of the paper, such as from radiant heaters or un-nipped rolls, as an independent step before, after, or instead of calendering or compression, can be conducted if strengthening or some other property modification is desired without, or in addition to, densification.

The honeycomb comprises high modulus fibers; as used herein high modulus fibers are those having a tensile or Young's modulus of 600 grams per denier (550 grams per dtex) or greater. High modulus of the fiber provides necessary stiffness of the final honeycomb structure and corresponding panel. In a preferred embodiment, the Young's modulus of the fiber is 900 grams per denier (820 grams per dtex) or greater. In the preferred embodiment, the fiber tenacity is at least 21 grams per denier (19 grams per dtex) and its elongation is at least 2% so as to provide a high level of mechanical properties to the final honeycomb structure.

In a preferred embodiment the high modulus fiber is heat resistant fiber. By "heat resistant fiber" it is meant that the fiber preferably retains 90 percent of its fiber weight when heated in air to 500° C. at a rate of 20 degrees Celsius per minute. Such fiber is normally flame resistant, meaning the fiber or a fabric made from the fiber has a Limiting Oxygen Index (LOI) such that the fiber or fabric will not support a flame in air, the preferred LOI range being about 26 and higher.

The high modulus fibers can be in the form of a floc or a pulp or a mixture thereof. By "floc" is meant fibers having a length of 2 to 25 millimeters, preferably 3 to 7 millimeters and a diameter of 3 to 20 micrometers, preferably 5 to 14 micrometers. Floc is generally made by cutting continuous spun filaments into specific-length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of high modulus material having a stalk and fibrils extending generally therefrom, wherein the stalk is generally columnar and about 10 to 50 micrometers in diameter and the fibrils are fine, hair-like members generally attached to the stalk measuring only a fraction of a micrometer or a few micrometers in diameter and about 10 to 100 micrometers long.

In some embodiments, the high modulus fibers useful in this invention include fiber made from para-aramid, polybenzazole, polypyridazole polymer or mixtures thereof. In some embodiments, the high modulus fibers useful in this invention include carbon fiber. In one preferred embodiment, the high modulus fiber is made from aramid polymer, especially para-aramid polymer. In an especially preferred embodiment the high modulus fiber is poly(paraphenylene terephthalamide).

As employed herein the term aramid means a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In some embodiments the preferred para-aramid is poly (paraphenylene terephthalamide). Methods for making para-aramid fibers useful in this invention are generally disclosed in, for example, U.S. Pat. Nos. 3,869,430; 3,869,429; and 3,767,756. Such aromatic polyamide fibers and various forms of these fibers are available from E. I. du Pont de Nemours and Company, Wilmington, Del. under the trademark Kevlar® fibers and from Teijin, Ltd., under the trademark Twaron®.

Commercially available polybenzazole fibers useful in this invention include Zylon® PBO-AS (Poly(p-phenylene-2,6-benzobisoxazole) fiber, Zylon® PBO-HM (Poly(p-phenylene-2,6-benzobisoxazole)) fiber, available from Toyobo, Japan. Commercially available carbon fibers useful in this invention include Tenax® fibers available from Toho Tenax America, Inc.

The honeycomb has 5 to 50 parts by weight thermoplastic material having a melting point of from 120° to 350° C. and a LOI of 26 or greater. Thermoplastic is meant to have its traditional polymer definition; these materials flow in the manner of a viscous liquid when heated and solidify when cooled and do so reversibly time and time again on subsequent heating and cooling steps. In some other preferred embodiments the melting point of the thermoplastic is from 180° to 300° C. In some other preferred embodiments the melting point of the thermoplastic is 220° to 250° C. While papers can be made with thermoplastic material having a melt point lower than 120° C., this paper can be susceptible to undesirable melt flow, sticking, and other problems after paper manufacture. For example, during honeycomb manufacture, after node line adhesive is applied to the paper, generally heat is applied to remove solvent from the adhesive. In another step, the sheets of paper are pressed together to adhere the sheets at the node lines. During either of these steps, if the paper has a low melt point thermoplastic material, that material can flow and undesirably adhere the paper sheets to manufacturing equipment and/or other sheets. Therefore, preferably the thermoplastic materials used in the papers can melt or flow during the formation and calendering of the paper, but do not appreciably melt or flow during the manufacture of honeycomb. Thermoplastic materials having a melt point above 350° C. are undesired because they require such high temperatures to soften that other components in the paper may begin to degrade during paper manufacture. In those embodiments where more than one type of thermoplastic material is present then at least 30% of the thermoplastic material should have melting point not above 350° C.

The thermoplastic material binds the high modulus fiber in the paper used in the honeycomb. The thermoplastic material can be in the form of flakes, particles, fibrids, floc or mixtures thereof. The term "fibrids" as used herein, means a very finely-divided polymer product of small, filmy, essentially two-dimensional, particles known having a length and width on the order of 100 to 1000 micrometers and a thickness only on the order of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated.

In some embodiments, when thermoplastic materials are incorporated into papers they form discrete film-like particles having a film thickness of about 0.1 to 5 micrometers and a minimum dimension perpendicular to that thickness of at least 30 micrometers. In one preferred embodiment, the maximum dimension of the particle perpendicular to the thickness is at most 1.5 mm. In some embodiments, the papers used in the honeycombs, and the honeycombs themselves, have at least 30 weight percent of the thermoplastic material present in the form of these discrete film-like particles. By "discrete" it is meant the particles form islands of film-like particles in a sea of high modulus fibers, and while there may be some overlap of film-like particles they do not form a continuous film of thermoplastic material in the plane of the paper. This allows relatively full movement of any matrix resins that are used to impregnate the honeycomb cell walls made from the paper. The presence and amount of such particles in the paper and the honeycomb can be determined by optical methods, such as by inspection of a sample of paper or honeycomb suitably prepared and viewed under adequate power to measure the size of the particles and count the average number of particles in a unit sample.

In some embodiments the thermoplastic material is deemed to be naturally flame retardant; that is, the thermoplastic polymer has a LOI of 26 or greater without the addition of any flame retardant chemicals. These types of thermoplastics include thermoplastic material selected from the group consisting of anisotropic melt polyesters, poly(butylene terephthalate), poly(acrylonitrile butadiene styrene), polyvinylchloride, polysulfone, poly(ether-ether-ketone), poly(ether-ketone-ketone), polyethersulfone, polyarylate, polyphenylsulfone, polyetherimide, polyamide-imide, and mixtures thereof.

In some embodiments the thermoplastic material is made flame retardant by the addition of flame retardant chemicals. That is, a flame retardant additive is added to the thermoplastic fiber, typically by the addition of a chemical into the polymer prior to fiber spinning that makes the final fiber have a LOI of 26 or greater. To achieve this limiting oxygen index, in some embodiments, the flame retardant is added to the thermoplastic material in the amount of about 10 to 15 percent by weight of the thermoplastic, and in some preferred embodiments the flame retardant is added in an amount of 12 to 13 percent by weight of the thermoplastic. These types of thermoplastics include thermoplastic material selected from the group consisting of flame retardant nylon, flame retardant polyester, flame retardant polyolefins and mixtures thereof.

In some embodiments, the preferred thermoplastic used in the paper is flame retardant polyester, and the preferred flame retardant polyester are flame retardant polyethylene terephthalate (FR PET) and flame retardant polyethylene naphthalate (FR PEN) polymers. These polymers may include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The FR PET may be obtained by known polymerization techniques from either terephthalic acid or its lower alkyl esters (e.g. dimethyl terephthalate) and ethylene glycol or blends or mixtures of these. FR PEN may be obtained by known polymerization techniques from 2,6-naphthalene dicarboxylic acid and ethylene glycol. Representative types of FR additives include such things as 8% octa-bromo diphenyl and 4% antiomony trioxide.

In other embodiments, the preferred thermoplastic polyesters used are liquid crystalline polyesters that are naturally flame retardant. By a "liquid crystalline polyester" (LCP) herein is meant a polyester polymer that is anisotropic when tested using the TOT test or any reasonable variation thereof, as described in U.S. Pat. No. 4,118,372, which is hereby included by reference. One preferred form of LCP is "all aromatic", that is all of the groups in the polymer main chain are aromatic (except for the linking groups such as ester groups), but side groups that are not aromatic may be present. LCP useful as thermoplastic material in this invention has melting point up to 350° C. Melting points are measured per test method ASTM D3418. Melting points are taken as the maximum of the melting endotherm, and are measured on the second heat at a heating rate of 10° C./min. If more than one melting point is present the melting point of the polymer is taken as the highest of the melting points. A preferred LCP for this invention include corresponding grades of Zenite® available from E. I. du Pont de Nemours and Company, and Vectra® LCP available from Ticona Co.

Other materials, particularly those often found in or made for use in thermoplastic compositions may also be present in the thermoplastic material as long as flame retardancy is not compromised. These materials should preferably be chemically inert and reasonably thermally stable under the operating environment of the honeycomb. Such materials may include, for example, one or more of fillers, reinforcing agents, pigments and nucleating agents. Other polymers may also be present, thus forming polymer blends. In some embodiments, other polymers are present it is preferred that they are less than 25 weight percent of the composition. In another preferred embodiment, other polymers are not present in the thermoplastic material except for a small total amount (less than 5 weight percent) of polymers such as those that function as lubricants and processing aids. In many embodiments care should be taken to include materials that are also flame retardant or minimize the amount of non-flame retardant materials.

One embodiment of the invention is an article comprising a honeycomb made from a paper comprising high modulus fiber and flame retardant thermoplastic material. When used in articles the honeycomb can function, if desired, as a structural component. In some preferred embodiments, the honeycomb is used at least in part in an aerodynamic structure. In some embodiments, the honeycomb has use as a structural component in such things as overhead storage bins and wing to body fairings on commercial airliners. Due to the lightweight structural properties of honeycomb, one preferred use is in aerodynamic structures wherein lighter weights allow savings in fuel or the power required to propel an object through the air.

Figure 3:
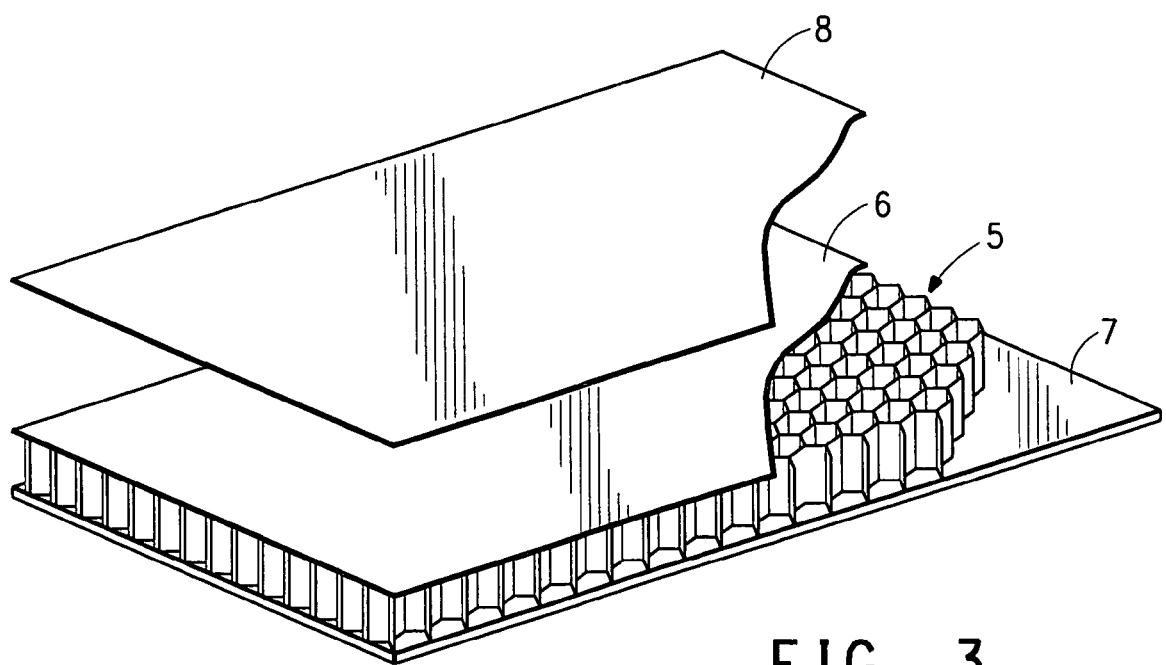
FIG. 3 is an illustration of honeycomb provided with facesheet(s).

Another embodiment of the invention is a panel comprising a honeycomb made from a paper comprising high modulus fiber and flame retardant thermoplastic material. One or more facesheets may be attached to the face of the honeycomb to form a panel. Facesheets provide integrity to the structure and help to realize the mechanical properties of the honeycomb core. Also, facesheets can seal the cells of the honeycomb to prevent material from entering the cells, or the facesheets can help retain material in the cells. FIG. 3 shows honeycomb 5 having a facesheet 6 attached to one face by use of an adhesive. A second facesheet 7 is attached to the opposing face of the honeycomb, and the honeycomb with the two opposing facesheets attached form a panel. Additional layers of material 8 can be attached to either side of the panel as desired. In some preferred embodiments face sheets applied to both sides of the honeycomb contain two layers of material. In some preferred embodiments, the facesheet comprises a woven fabric or a crossplied unidirectional fabric. In some embodiments crossplied unidirectional fabric is a 0/90 crossply. If desired, the facesheet can have a decorative surface, such as embossing or other treatment to form an outer surface that is pleasing to the eye. Fabrics containing glass fiber and/or carbon and/or other high strength and high modulus fibers are useful as facesheet material.

In some embodiments the honeycomb can be made by methods such as those described in U.S. Pat. Nos. 5,137,768; 5,789,059; 6,544,622; 3,519,510; and 5,514,444. These methods for making honeycomb generally require the application or printing of a number of lines of adhesive (node lines) at a certain width and pitch on one surface of the high modulus paper, followed by drying of the adhesive. Typically the adhesive resin is selected from epoxy resins, phenolic resins, acrylic resins, polyimide resins and other resins, however, it is preferred that a thermoset resin be used.

After application of node lines, the high modulus paper is cut at a predetermined interval to form a plurality of sheets. The cut sheets are piled one on top of the other such that each of the sheets is shifted to the other by half a pitch or a half the interval of the applied adhesive. Each of the piled high modulus fiber-containing paper sheets are then bonded to each other along the node lines by the application of pressure and heat. The bonded sheets are then pulled apart or expanded in directions perpendicular to the plane of the sheets to form a honeycomb having cells. Consequently, the formed honeycomb cells are composed of a planar assembly of hollow, columnar cells separated by cell walls made of paper sheets that were bonded to each other along a number of lines and which were expanded.

If desired, the honeycomb can be impregnated with a structural resin after it is expanded. Typically this is accomplished by dipping the expanded honeycomb into a bath of thermoset resin, however, other resins or means such as sprays could be employed to coat and fully impregnate and/or saturate the expanded honeycomb. After the honeycomb is fully impregnated with resin, the resin is then cured by heating the saturated honeycomb to crosslink the resin. Generally this temperature is in the range of 150° C. to 180° C. for many thermoset resins.

The honeycomb before or after resin impregnation and curing, may be cut into slices. In this way, multiple thin sections or slices of honeycomb can be obtained from a large block of honeycomb. The honeycomb is generally sliced perpendicular to the plane of the cell edges so that the cellular nature of the honeycomb is preserved.

The honeycomb can further comprise inorganic particles, and depending on the particle shape, the particular paper composition, and/or other reasons, these particles can be incorporated into the paper during papermaking (for example, mica flakes, vermiculite, and the like) or into they may be incorporated into the matrix or structural resin (for example, silica powder, metal oxides, and the like.)

TEST METHODS

The UL-94 flammability rating is determined using Underwriters Laboratories, Inc. test method UL 94, "Standard for Flammability of Plastic Materials for Parts in Devices and Appliances". Fiber denier is measured using ASTM D1907. Fiber modulus, tenacity, and elongation are measured using ASTM D885. Paper density is calculated using the paper thickness as measured by ASTM D374 and the basis weight as measured by ASTM D646.

EXAMPLE

An aramid/thermoplastic paper comprised of Teijin Twaron® 1080 chopped filament fiber, Teijin Twaron® 1094 pulp and Toray Torcon® polyphenylene sulfide fiber is formed on conventional paper forming equipment. The composition of the paper is 52 weight % Twaron 1080 fiber, 18 weight % Twaron 1094 pulp and 30 weight % Torcon® fiber. The Twaron 1080 fiber has a nominal filament linear density of 1.5 denier per filament (1.7 dtex per filament) and a 6 mm cut length. The Torcon® thermoplastic fiber has a Limiting Oxygen Index of 34 (measured by ISO4589 test method), a nominal filament linear density of 2 denier per filament (2.2 dtex per filament) and a 6 mm cut length.

The paper is calendered under 1200 N/cm of linear pressure and at 280° C. This produces an aramid/thermoplastic paper with a density of about 0.75 g/cm$^3$ and a UL-94 flammability rating of V-0.

A honeycomb is formed from the calendered paper. Node lines of adhesive are applied to the paper surface at a width of 2 mm and a pitch of 5 mm. The adhesive is a 50% solids solution comprising 70 weight parts of an epoxy resin identified as Epon 826 sold by Shell Chemical Co.; 30 weight parts of an elastomer-modified epoxy resin identified as Heloxy WC 8006 sold by Wilmington Chemical Corp, Wilmington, Del., USA; 54 weight parts of a bisphenol A-formaldehyde resin curing agent identified as UCAR BRWE 5400 sold by Union Carbide Corp.; 0.6 weight parts of 2-methylimidazole as a curing catalyst, in a glycol ether solvent identified as Dowanol PM sold by The Dow Chemical Company; 7 parts of a polyether resin identified as Eponol 55-B-40 sold by Miller-Stephenson Chemical Co.; and 1.5 weight parts of fumed silica identified as Cab-O-Sil sold by Cabot Corp. The adhesive is partially cured on the paper in an oven at 130° C. for 6.5 minutes.

The sheet with the adhesive node lines is cut into 500 mm lengths. 40 sheets are stacked one on top of the other, such that each of the sheets is shifted to the other by half a pitch or a half the interval of the applied adhesive node lines. The shift occurs alternately to one side or the other, so that the final stack is uniformly vertical. The stacked sheets are then hot-pressed at the softening point of the adhesive, causing the adhesive node lines to soften; once the heat is removed the adhesive then hardens to bond the sheets with each other. For the node line adhesive above, the hot press operates at 140° C. for 30 minutes and then 177° C. for 40 minutes at 3.5 kg per square cm pressure.

The bonded aramid sheets are then expanded in the direction counter to the stacking direction to form cells having an equilateral cross section. Each of the sheets are extended between each other such that the sheets are folded along the edges of the bonded node lines and the portions not bonded are extended in the direction of the tensile force to separate the sheets from each other. A frame is used to expand and hold the honeycomb in the expanded shape.

The expanded honeycomb is then placed in a bath containing PLYOPHEN 23900 solvent-based phenolic resin from the Durez Corporation. The resin adheres to and covers the interior surface of the cell walls and can also fill in and penetrate into the pores of the paper.

After impregnating with resin, the honeycomb is taken out from the bath and is dried in a drying furnace by hot air first at 82° C. for 15 minutes and then at 121° C. for 15 minutes and then at 182° C. for 60 minutes to remove the solvent and harden the phenolic resin. The impregnating step in the resin bath and the drying step in the drying furnace are repeated for 5 times so that the cell walls of the honeycomb are coated by and impregnated with 730 grams of the reinforcing resin. The frame holding the honeycomb is then removed.

What is claimed is:

1. A honeycomb having cells comprising a flame resistant non-woven paper, the cells being expanded paper sheets bonded to each other along a number of node lines of applied adhesive;
the non-woven paper comprising:
   a) 5 to 50 parts by weight thermoplastic material having a melting point of from 180° to 300° C., and
   b) 50 to 95 parts by weight of a high modulus fiber having a modulus of 600 grams per denier (550 grams per dtex) or greater, based on the total amount of thermoplastic material and high modulus fiber in the paper,
wherein the thermoplastic has a limiting oxygen index of at least 26; and
wherein the thermoplastic material is required to flow in a manner of a viscous liquid when heated and solidify when cooled and do so reversibly time and time again on subsequent heating and cooling steps.

2. The honeycomb of claim 1 wherein the paper has a flammability classification of UL-94 V-0 or better.

3. The honeycomb of claim 1 wherein the thermoplastic is selected from the group consisting of anisotropic melt polyesters, poly(butylene terephthalate), poly(acrylonitrile butadiene styrene), polyvinylchloride, polysulfone, poly(ether-ether-ketone), poly(ether-ketone-ketone), polyethersulfone, polyarylate, polyphenylsulfone, polyetherimide, polyamide-imide, and mixtures thereof.

4. The honeycomb of claim 1 wherein the thermoplastic is selected from the group consisting of flame retardant nylon, flame retardant polyester, flame retardant polyolefins and mixtures thereof.

5. The honeycomb of claim 1 wherein the high modulus fiber comprises para-aramid fiber.

6. The honeycomb of claim 5 wherein the para-aramid fiber is poly (paraphenylene terephthalamide) fiber.

7. The honeycomb of claim 1 wherein the high modulus fiber is selected from the group consisting of carbon fiber, polybenzazole fiber, polypyridazole fiber, and mixtures thereof.

8. The honeycomb of claim 1 wherein the thermoplastic material is present in an amount of from 20 to 40 parts by weight.

9. The honeycomb of claim 1 wherein the high modulus fiber is present in an amount of from about 60 to 80 parts by weight.

10. The honeycomb of claim 1 further comprising a thermoset matrix resin.

11. The honeycomb of claim 1 further comprising inorganic particles.

12. An article comprising the honeycomb of claim 1.

13. An aerodynamic structure comprising the honeycomb of claim 1.

14. A panel comprising the honeycomb of claim 1 and a facesheet attached to a face of the honeycomb.

15. The honeycomb of claim 1 wherein the melting point of the thermoplastic is 220° to 250° C.

* * * * *